United States Patent [19]

Cullen et al.

[11] Patent Number: 5,069,694
[45] Date of Patent: Dec. 3, 1991

[54] PACKET FOR COMPOUND TREATMENT OF GASES

[75] Inventors: John S. Cullen, Buffalo; Samuel A. Incorvia, Tonawanda, both of N.Y.

[73] Assignee: Multiform Desiccants, Inc., Buffalo, N.Y.

[21] Appl. No.: 546,837

[22] Filed: Jul. 2, 1990

[51] Int. Cl.⁵ .............................................. B01D 59/14
[52] U.S. Cl. ...................................... 55/318; 55/387; 34/81; 206/0.7; 428/34.3
[58] Field of Search ................. 55/387, 390, 318, 316, 55/466; 34/80, 81; 206/0.6, 0.7, 0.5, 204, 484, 328, 312; 428/34.3, 35.2

[56] References Cited

U.S. PATENT DOCUMENTS

| | | | |
|---|---|---|---|
| 2,578,324 | 12/1951 | Southwick, Jr. | 206/204 X |
| 2,961,678 | 11/1960 | MacLellan, Jr. et al. | 206/484 X |
| 3,012,894 | 12/1961 | Nagel | 206/484 X |
| 3,820,309 | 6/1974 | Cullen et al. | 55/387 |
| 3,908,824 | 9/1975 | Takahara et al. | 206/312 |
| 3,990,872 | 11/1976 | Cullen | 55/274 |
| 4,160,059 | 7/1979 | Samejima | 55/316 X |
| 4,247,002 | 1/1981 | Horian | 206/312 X |
| 4,259,092 | 3/1981 | Matsuo et al. | 55/390 X |
| 4,272,264 | 6/1981 | Cullen et al. | 55/387 |
| 4,289,513 | 9/1981 | Brownhill et al. | 55/387 |
| 4,610,353 | 9/1986 | Young | 206/328 |
| 4,748,069 | 5/1988 | Cullen | 428/34.3 X |
| 4,749,392 | 6/1988 | Aoki et al. | 55/387 |
| 4,749,600 | 6/1988 | Cullen et al. | 428/34.3 |
| 4,830,643 | 5/1989 | Sassa et al. | 55/316 |

Primary Examiner—Bryon P. Gehman
Attorney, Agent, or Firm—Joseph P. Gastel

[57] ABSTRACT

A packet for effecting a compound treatment of gaseous material by desiccation and/or absorption and/or adsorption including a permeable envelope of carbon-loaded sheet material for effecting a first treatment of gaseous material which comes into contact with it, and bulk material in the envelope for effecting a second treatment of the gaseous material which enters the envelope. An envelope fabricated of carbon-loaded paper for receiving a foreign body and adsorbing gases which may deleteriously affect it.

7 Claims, 1 Drawing Sheet

PACKET FOR COMPOUND TREATMENT OF GASES

BACKGROUND OF THE INVENTION

The present invention relates to an improved packet for providing a compound treatment of gaseous material by desiccation and/or absorption and/or adsorption and to an envelope for adsorbing gases which might deleteriously affect its contents.

By way of background, desiccant packets, adsorbent packets and absorbent packets are well known. All of these packets contain a suitable bulk material within a permeable envelope and are used to treat gases in the environments in which they are placed.

SUMMARY OF THE INVENTION

It is one object of the present invention to provide an improved packet for effecting a compound treatment of gaseous material by desiccation and/or absorption and/or adsorption.

Another object of the present invention is to provide an envelope fabricated of carbon-loaded paper for adsorbing gases which might deleteriously affect its contents. Other objects and attendant advantages of the present invention will readily be perceived hereafter.

The present invention relates to a packet for effecting a compound treatment of gaseous material comprising a permeable envelope of carbon-loaded sheet material for effecting a first treatment of said gaseous material, and bulk material in said envelope for effecting a second treatment of said gaseous material which enters the envelope.

The present invention also relates to an envelope for protecting the contents thereof which could be deleteriously affected by gases comprising first and second sheets of carbon-loaded paper, means for securing said first and second sheets along a plurality of edges thereof, and an opening between said first and second sheets for receiving said contents.

The various aspects of the present invention will be more fully understood when the following portions of the specification are read in conjunction with the accompanying drawings wherein:

DESCRIPTION OF THE PREFERRED EMBODIMENTS

Figure 1:
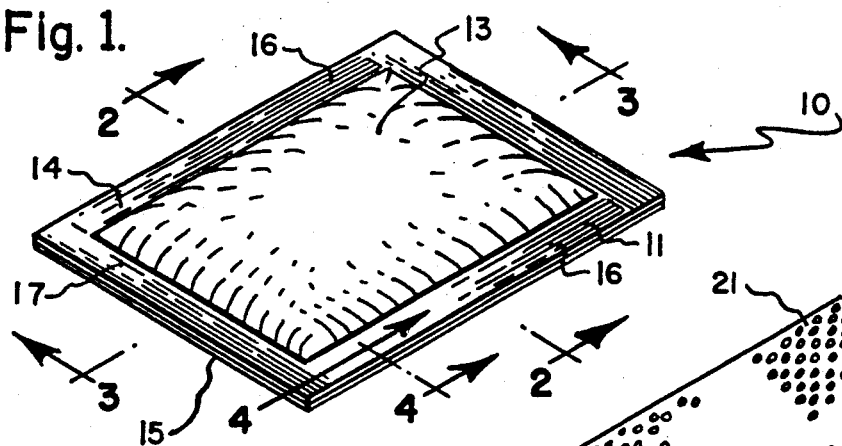
FIG. 1 is a perspective view of the improved packet of the present invention.
Figure 5:
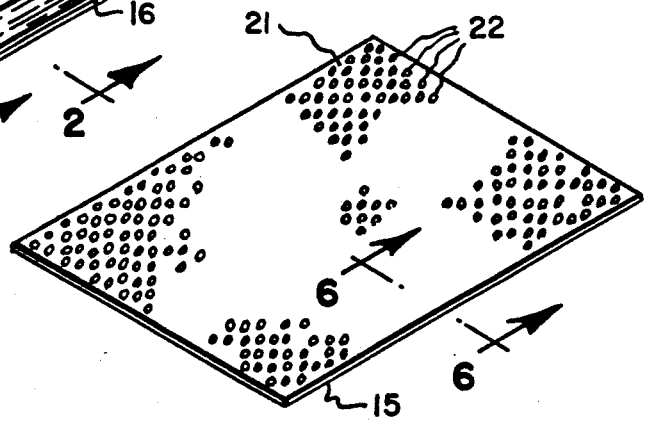
FIG. 5 is a perspective view of the dot matrix coated carbon-loaded paper sheet material.
Figure 2:
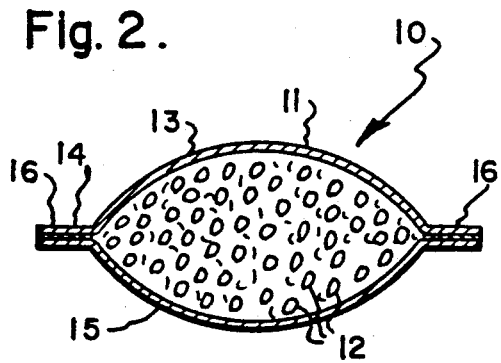
FIG. 2 is a cross sectional view taken substantially along line 2—2 of FIG. 1.

One embodiment of the present invention is an improved packet 10 for effecting a compound treatment of gaseous material by desiccation and/or absorption and/or adsorption by virtue of the fact that the envelope 11 is fabricated from a carbon-loaded paper which provides a first stage of treatment for gases passing therethrough, and the envelope contains a filling 12 of suitable absorbent or adsorbent granular bulk material which provides a second stage of treatment gaseous material which enters the envelope.

The envelope 11 includes an upper sheet 13 which is bonded around border 14 to lower sheet 15. Border 14 includes two opposite sides 16 and two opposite sides 17. The ends of borders 16 and 17 merge into each other to completely confine the bulk material 12 within envelope 11. The sides 16 and 17 of the border are formed by the adhesion of the outer edges of sheet materials 13 and 15 to each other in any suitable manner as by gluing or any other type of sealing in addition to the preferred method described hereafter.

Figure 6:
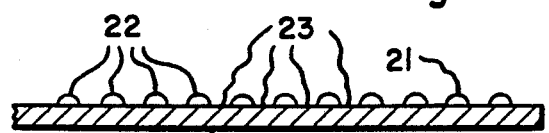
FIG. 6 is a fragmentary enlarged cross sectional view taken substantially along line 6—6 of FIG. 5.
Figure 3:
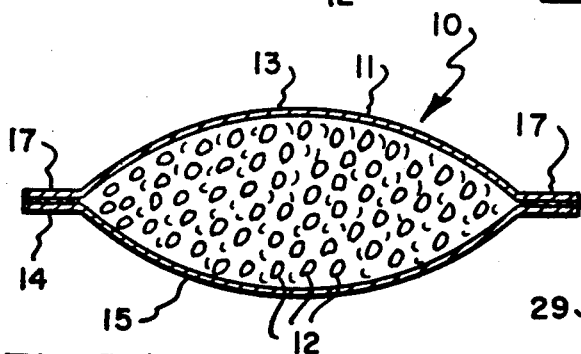
FIG. 3 is a cross sectional view taken substantially along line 3—3 of FIG. 1.
Figure 4:
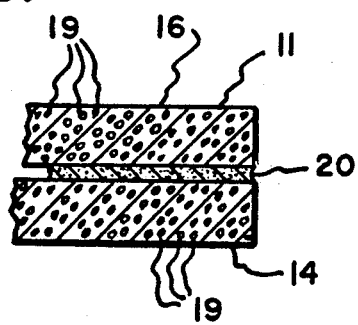
FIG. 4 is an enlarged fragmentary cross sectional view taken substantially along line 4—4 of FIG. 1.

The sheets 13 and 15 are preferably carbon-loaded paper which is a gas-permeable paper product which has powdered carbon 19 dispersed therein. As shown in FIG. 4, the edges 16 and 17 of border 14 are adhesively secured to each other by suitable adhesive 20. One preferred method of bonding the edges of carbon-loaded sheets 13 and 15 to each other is by coating the sheets in their entireties in a dot matrix pattern 21, wherein dots 22 of any suitable heat-fusible plastic material, preferably polyethylene, are deposited on the face of the sheet and there are uncoated spaces 23 (FIG. 6) between the dots, so even though the dots 22 spread and possibly fuse solid within border 14, the central portions of the packet have dots 22 interspersed with undotted portions 23 so that the dots 22 do not significantly affect the permeability of the central portion of packet 10. A suitable carbon-loaded paper is commercially available under the trademark GETTER of the Mead Paper Company. It comes in various grades having 20% and 50% carbon content. The 20% content is 5 mils thick and the 50% content comes in thicknesses of 9 and 18 mils. Any of the foregoing can be used, depending on the application.

The granular material 12 may be any suitable desiccant adsorbent or absorbent and may selectively include, without limitation, adsorbents such as silica gel, metal alumino silicate, alumina, calcium sulfate, activated charcoal, molecular sieve, or any other desired compound, in bead, pellet or granular form, or combinations thereof.

In use, packet 10 is inserted in an environment wherein the gaseous material may have a plurality of undesirable components which are to be removed, for example, an undesirable odor and moisture. Thus, the carbon of the carbon-loaded paper envelope will absorb the undesirable odors, and the bulk material 12 within the envelope will adsorb the moisture. The carbon-loaded paper has the advantage that the carbon is securely locked therein so that there will be no carbon dusting of the material with which the packet 10 is packed. Furthermore, the fact that the carbon is locked into the paper, as contrasted to the carbon being mixed with the bulk material, obviates the tendency for the carbon to dust onto the borders which are to be sealed with the deleterious effect of preventing proper bonding. Also, since the amount of carbon in the carbon-loaded paper is known, the size of the envelope can be calculated for use in specific environments. In the foregoing respect, the amount of material within the envelope, other than carbon, can be precisely calculated, whereas if carbon was present, it would sometimes be difficult to assure that it and the other component were in precise proportions. Furthermore, the use of the carbon-loaded paper eliminates the need to use powdered carbon within the envelope itself for the odor-absorbing characteristic, thereby eliminating this part of the manufacturing process. Additionally, carbon has a high moisture content, and if it is mixed with desiccant, it detracts from the effectiveness thereof, whereas this is not the case with carbon-loaded paper.

Figure 7:
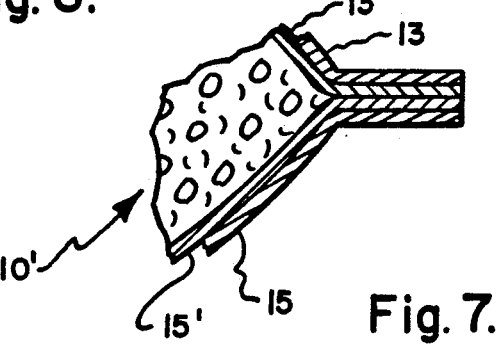
FIG. 7 is a fragmentary cross sectional view of another embodiment of the present invention.

If desired, multiple layers of carbon-loaded paper can be utilized for the envelope to obtain additional odor-absorbing capacity. This is fragmentarily shown in FIG. 7 wherein the packet 10' includes upper layers 13 and 13' of carbon-loaded paper and two layers 15 and 15' of carbon-loaded paper. Otherwise, the embodiment of FIG. 7 is identical to the embodiment of FIG. 1.

Figure 8:
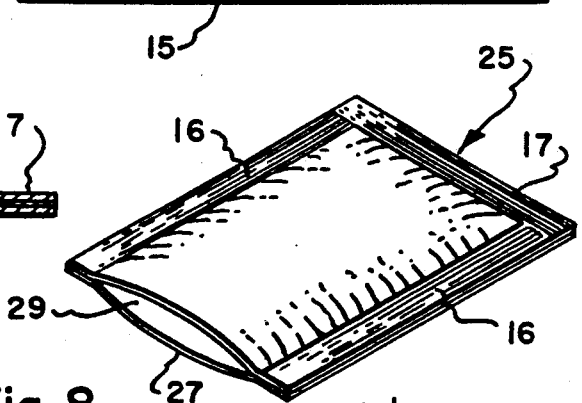
FIG. 8 is a perspective view of an envelope of carbon-loaded paper for adsorbing gases and thus for protecting the contents therein from being deleteriously affected by said gases.

In FIG. 8 another embodiment of the present invention is shown. This embodiment is an envelope 25 comprising two sheets 27 of carbon-loaded paper which are sealed along three edges, such as two edges 16 and one edge 17 of FIG. 1 while the end 29 of the envelope which is opposite to edge 17 remains open to receive the contents which are to be protected from environmental gases by adsorbing them. If desired, the open end 29 can be sealed after the contents are placed therein, so that the final product is a packet, such as shown in FIG. 1. The contents may be such items as silverware or any other material or substance which is to be protected from gases which are readily adsorbed by the carbon in the carbon-loaded paper. The edges of the envelope 25 may be sealed in the manner discussed above relative to FIGS. 1-7.

While preferred embodiments of the present invention have been disclosed, it will be appreciated that it is not limited thereto but may be otherwise embodied within the scope of the following claims.

What is claimed is:

1. A packet for effecting a compound treatment of gaseous material comprising a permeable envelope of sheet material, the sheet material having powdered carbon dispersed therein for effecting a first treatment of said gaseous material, and bulk material means in said envelope for effecting a second treatment of said gaseous material.

2. A packet as set forth in claim 1 wherein said sheet material comprises paper.

3. A packet as set forth in claim 1 wherein said envelope comprises first and second sheets of said material, a plurality of borders on said first and second sheets of material, and means joining said borders to confine said bulk material means within said envelope.

4. A packet as set forth in claim 3 wherein said means joining said borders comprises an adhesive.

5. A packet as set forth in claim 3 wherein said sheet material comprises paper, and wherein said means joining said borders comprises a coating of dots in a dot matrix pattern of heat-fusible plastic, and uncoated portions of said carbon-loaded paper between said dots of said, dot-matrix pattern.

6. A packet as set forth in claim 1 wherein said permeable envelope comprises a plurality of sides with at least one of said sides containing a plurality of layers of said sheet material.

7. A packet as set forth in claim 6 wherein said plurality of sides each contain a plurality of layers of said sheet material.

* * * * *